United States Patent

Parsoneault et al.

[11] Patent Number: 5,678,929
[45] Date of Patent: Oct. 21, 1997

[54] GROOVED HYDRODYNAMIC BEARING ARRANGEMENT INCLUDING A POROUS LUBRICANT RESERVOIR

[75] Inventors: Norbert Steven Parsoneault, Watsonville; Gregory Ian Rudd, Aptos; Raquib Uddin Khan, Pleasanton; Michael David Kennedy, Boulder Creek, all of Calif.

[73] Assignee: Seagate Technology, Inc., Scotts Valley, Calif.

[21] Appl. No.: 650,303

[22] Filed: May 20, 1996

[51] Int. Cl.[6] ................................................. F16C 17/10
[52] U.S. Cl. ............................................. 384/112; 384/107
[58] Field of Search ............................... 384/107, 112, 384/113, 115, 123

[56] References Cited

U.S. PATENT DOCUMENTS

| | | |
|---|---|---|
| 2,937,058 | 5/1960 | Boggs . |
| 3,256,049 | 6/1966 | Josephson et al. . |
| 3,419,318 | 12/1968 | Harter . |
| 3,424,506 | 1/1969 | Korinek . |
| 3,985,404 | 10/1976 | Plaza et al. . |
| 4,174,139 | 11/1979 | Abel . |
| 4,200,344 | 4/1980 | Binns et al. . |
| 4,206,952 | 6/1980 | Olschewski et al. . |
| 4,371,220 | 2/1983 | Brucher . |
| 4,491,373 | 1/1985 | Sugi et al. . |
| 5,028,148 | 7/1991 | Kanamaru et al. . |
| 5,201,386 | 4/1993 | Lederman . |
| 5,295,330 | 3/1994 | Hoffman . |

FOREIGN PATENT DOCUMENTS 119222   9/1980   Japan .

*Primary Examiner*—Lenard A. Footland
*Attorney, Agent, or Firm*—LaRiviere, Grubman & Payne

[57] ABSTRACT

The hydrodynamic bearing arrangement comprises a journal sleeve defining a journal bore and a journal thrust surface. A shaft is mounted in the journal bore by means of a hydrodynamic journal bearing which permits rotation of the shaft and the journal sleeve relative to one another. A thrust plate extends transversely from the shaft and defines two hydrodynamic thrust bearings in combination with the journal thrust surface and a counterplate which is mounted adjacent to the thrust plate. A porous lubricant reservoir is mounted adjacent to the thrust plate. The porous lubricant reservoir serves to remove wear particles from the lubricant in the bearing arrangement, and provides a supply of lubricant to the hydrodynamic journal and thrust bearings should they become depleted of lubricant.

14 Claims, 2 Drawing Sheets

GROOVED HYDRODYNAMIC BEARING ARRANGEMENT INCLUDING A POROUS LUBRICANT RESERVOIR

TECHNICAL FIELD

The present invention relates to a grooved hydrodynamic bearing arrangement for a spindle motor assembly. More specifically, the invention relates to a grooved hydrodynamic bearing arrangement for a computer hard disc drive spindle motor assembly.

BACKGROUND OF THE INVENTION

Computer hard disc drives generally comprise an array of magnetic discs mounted to a spindle motor assembly. Data is written to, and read from, each magnetic disc by means of a read/write head located at the end of an arm which extends between the discs. Positioning of the arm is accomplished by means of a voice coil motor under the control of disc drive control electronics.

The array of magnetic discs is mounted to a hub of the spindle motor assembly. The hub is mounted for rotation with respect to a base of the spindle motor assembly by means of a grooved hydrodynamic bearing arrangement. In use, the hub is rotated by means of an electromagnetic motor.

In order to facilitate the accurate positioning of the read/write heads between the magnetic discs, the bearing arrangement is required to run substantially vibration-free and to have a small deflection under the application of external loads (i.e., have a high bearing stiffness). The bearing arrangement is also expected to have a long, maintenance-free service life. The continuous trend of miniaturization in the computer industry has meant that the above functions have to be accomplished by a bearing arrangement which occupies as little volume as possible.

In known hydrodynamic bearing arrangements, wear particles accumulate in the lubricant over the life of the hydrodynamic bearing as a result of the occasional contact of the bearing surfaces. These wear particles abrade the bearing surfaces and reduce the service life of the hydrodynamic bearing. Accordingly, it would be desirable to eliminate or reduce the amount of wear particles in the lubricant.

Prior hydrodynamic bearing arrangements also experience problems with leakage of bearing lubricant. Leakage of lubricant from the spindle motor assembly is very undesirable in a computer disc drive as contamination of the discs and read/write heads may result.

Traditionally, prevention of leakage from a hydrodynamic bearing arrangement which was filled to capacity with lubricant was difficult. Leakage was reduced by priming the hydrodynamic bearing arrangement with a minimum quantity of lubricant. This in turn adversely affected the service life of the hydrodynamic bearing arrangement.

Accordingly, it would be advantageous to have a hydrodynamic bearing arrangement in which there is adequate lubricant, but with a reduction in the leakage associated with prior hydrodynamic bearing arrangements.

SUMMARY OF THE INVENTION

The present invention provides a hydrodynamic bearing arrangement for a high-speed spindle motor assembly. The bearing arrangement includes a porous lubricant reservoir.

More particularly, according to the invention there is provided a hydrodynamic bearing arrangement comprising a journal sleeve defining a journal bore, and further defining a journal thrust surface extending transversely to the journal bore. A shaft is mounted in the journal bore and the shaft and the journal bore define together a hydrodynamic journal bearing which permits rotation of the shaft and the journal sleeve relative to one another. A thrust plate extends transversely from the shaft and defines first and second thrust surfaces. The first thrust surface and the journal thrust surface define together a first hydrodynamic thrust bearing. A counterplate is mounted to the journal sleeve and defines a counterplate thrust surface. The counterplate thrust surface and the second thrust surface define together a second hydrodynamic thrust bearing. The hydrodynamic bearing arrangement further comprises a first porous lubricant reservoir which is mounted adjacent to the thrust plate.

The porous lubricant reservoir of the present invention removes wear particles from the lubricant. By removing these wear particles, the service life of the hydrodynamic bearing arrangement is lengthened.

The porous lubricant reservoir also provides a supply of lubricant to replenish any lubricant which is lost over the course of the service life of the spindle motor assembly. This also contributes to an increase in the service life of the hydrodynamic bearing arrangement.

Other features of the present invention are disclosed or apparent in the section entitled: "BEST MODE FOR CARRYING OUT THE INVENTION."

BRIEF DESCRIPTION OF THE DRAWINGS

For fuller understanding of the present invention, reference is made to the accompanying drawings in the following detailed description of the Best Mode of Carrying Out the Present Invention. In the drawings.

BEST MODE FOR CARRYING OUT THE INVENTION

As hard disc drives and spindle motors are both well-known in the art, in order to avoid confusion while enabling those skilled in the art to practice the claimed invention, this specification omits many details with respect to known items.

Figure 1:
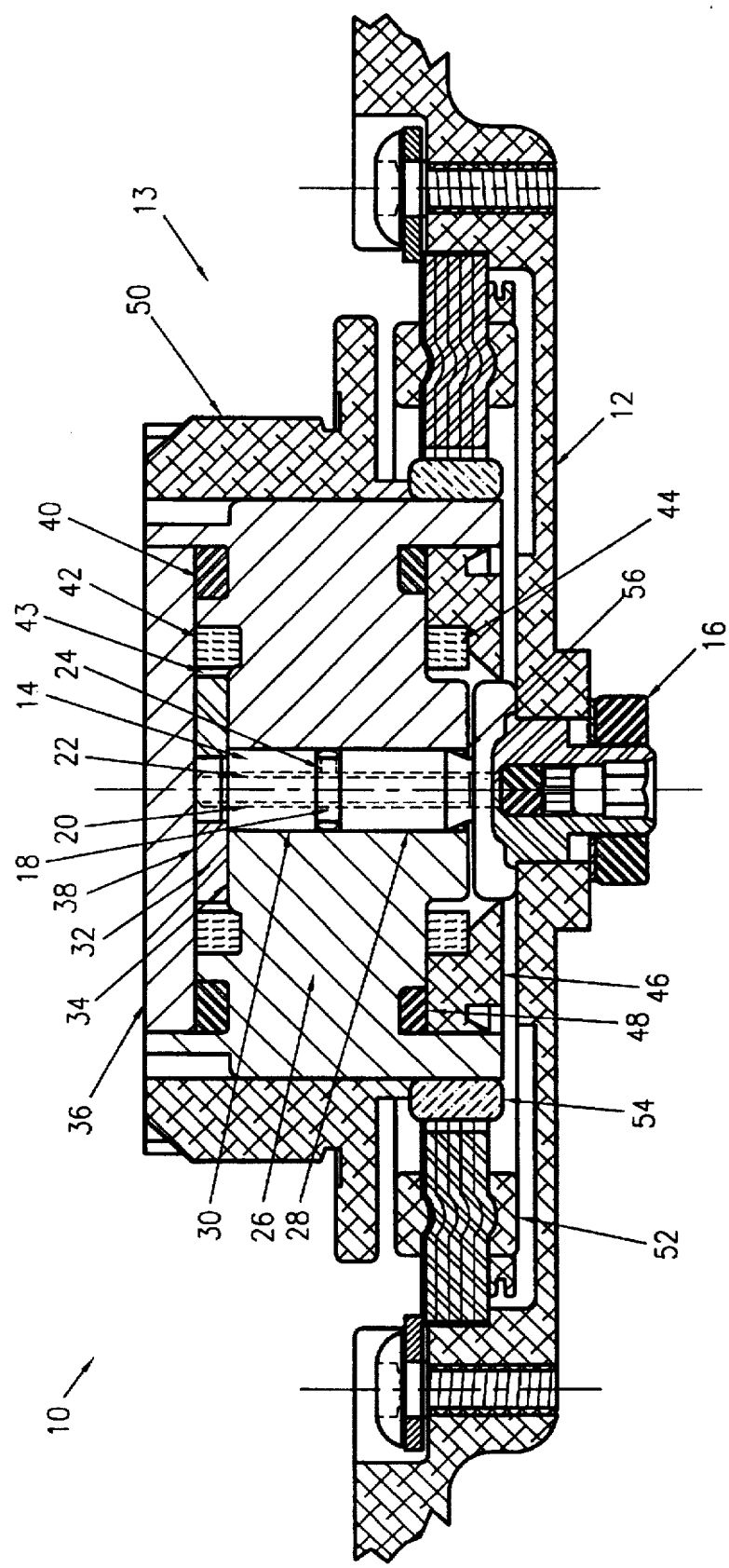
FIG. 1 is an elevation view in cross-section of a computer hard disc spindle motor assembly) taken along the axis of rotation of the spindle motor assembly.

FIG. 1 illustrates a cross section through one embodiment of a spindle motor assembly incorporating a hydrodynamic bearing arrangement according to the invention. The spindle motor assembly, generally indicated by the numeral 10, comprises a base 12 and a hub assembly 13.

A shaft 14 is mounted to the base 12 by means of a nut 16. The shaft 14 is provided with a circumferential groove 18 and a bore 20. Located in the bore 20 is an insert 22 in the form of a length of nylon line. The insert 22 fills most of the volume of the bore 20, and therefore only a small gap is defined between the insert 22 and the bore 20. A passage 24 extends between the groove 18 and the bore 20. The bore 20 and the passage 24 together define a fluid return path between the groove 18 and a counterplate 36.

The outer surface of the shaft 14 and the adjacent bore of a journal sleeve 26 together form hydrodynamic journal bearings 28, 30. The bearing gaps at hydrodynamic journal bearings 28, 30 are typically between 0.003 mm and 0.006 mm.

The hydrodynamic journal bearings 28, 30 each include a grooved surface as described below with reference to FIG. 2. In this embodiment of the hydrodynamic bearing arrangement, these grooved surfaces are provided on the shaft 14. They could however alternatively be provided on the bore of the journal sleeve 26.

A thrust plate 32 is press-fitted to one end of the shaft 14 and extends transversely to the shaft 14. The thrust plate 32 defines a first thrust surface which, together with an adjacent journal thrust surface, defines a first hydrodynamic thrust bearing 34. As can be seen from FIG. 1, the journal thrust surface at hydrodynamic bearing 34 extends transversely to the journal bore at 30.

The counterplate 36 is press-fitted to the journal sleeve 26 adjacent to the thrust plate 32. The counterplate 36 defines a counterplate thrust surface which, together with a second thrust surface defined by the thrust plate, forms a second hydrodynamic thrust bearing 38. The counterplate 36 is sealed to the journal sleeve 26 by means of an O-ring 40.

The bearing gaps at the first and second hydrodynamic thrust bearings 34, 38 are typically each between 0.005 mm and 0.020 mm. The size of these thrust bearing gaps depends in part on whether the hydrodynamic thrust bearings are preloaded or non-preloaded. The bearing gap in a preloaded hydrodynamic thrust bearing is smaller than in a non-preloaded hydrodynamic thrust bearing. Although the hydrodynamic thrust bearings may either be preloaded or non-preloaded in a hydrodynamic bearing arrangement according to the invention, the illustrated best mode hydrodynamic bearing arrangement has preloaded hydrodynamic thrust bearings.

The first and second hydrodynamic thrust bearings 34, 38 each include a grooved surface as described below with reference to FIG. 2. In this embodiment of the hydrodynamic bearing arrangement, these grooved surfaces are provided on the thrust plate 32. They could however alternatively be provided on the counterplate 36 and/or the thrust surface of the journal sleeve 26.

Mounted in the journal sleeve 26 adjacent to the thrust plate 32 is a first porous lubricant reservoir 42 which is in the shape of an annular ring. The first porous lubricant reservoir 42 is made of a porous polypropylene with an open-pore structure, i.e., the pores are interconnected. The first porous lubricant reservoir typically has a pore size of between 0.07 mm and 0.10 mm and is impregnated with lubricant.

As can be seen from FIG. 1, there is a clearance 43 between first porous lubricant reservoir 42 and the thrust plate 32. The clearance 43 is relatively larger than the size of the pores of the first porous lubricant reservoir 42. This relatively larger clearance has the advantage that, if bubbles form in the lubricant during operation of the spindle motor assembly 10, the bubbles will tend to collect in this clearance rather than in the hydrodynamic bearings 28,30,34 and 38, or in the first porous lubricant reservoir 42.

A second porous lubricant reservoir 44 having the same characteristics as the first porous lubricant reservoir 42 is mounted in the journal sleeve 26 adjacent to an open end 56 of the hydrodynamic journal bearing 28. The second porous lubricant reservoir 44 is not initially impregnated with lubricant, and can thus absorb any lubricant which may leak from the open end 56 of the hydrodynamic journal bearing 28. The second porous lubricant reservoir 44 is held in place by a ring 46 which is staked into the journal sleeve 26. The ring 46 is sealed to the journal sleeve 26 by means of an O-ring 48.

A hub sleeve 50 is fitted around the journal sleeve 26. The hub sleeve 50 supports an array of magnetic discs (not shown).

The hub assembly 13 is rotated with respect to the base 12 in use by means an electromagnetic motor. The electromagnetic motor comprises a stator assembly 52 mounted to the base 12, and a magnet 54 mounted to the journal sleeve 26.

As can be appreciated from FIG. 1, the hub assembly 13, which generally comprises the journal sleeve 26, hub sleeve 50, counterplate 36, and first and second porous lubricant reservoirs 42 and 44, is supported for rotation relative to the base 12 and shaft 14 on hydrodynamic bearings 28, 30, 34, and 38.

Figure 2:
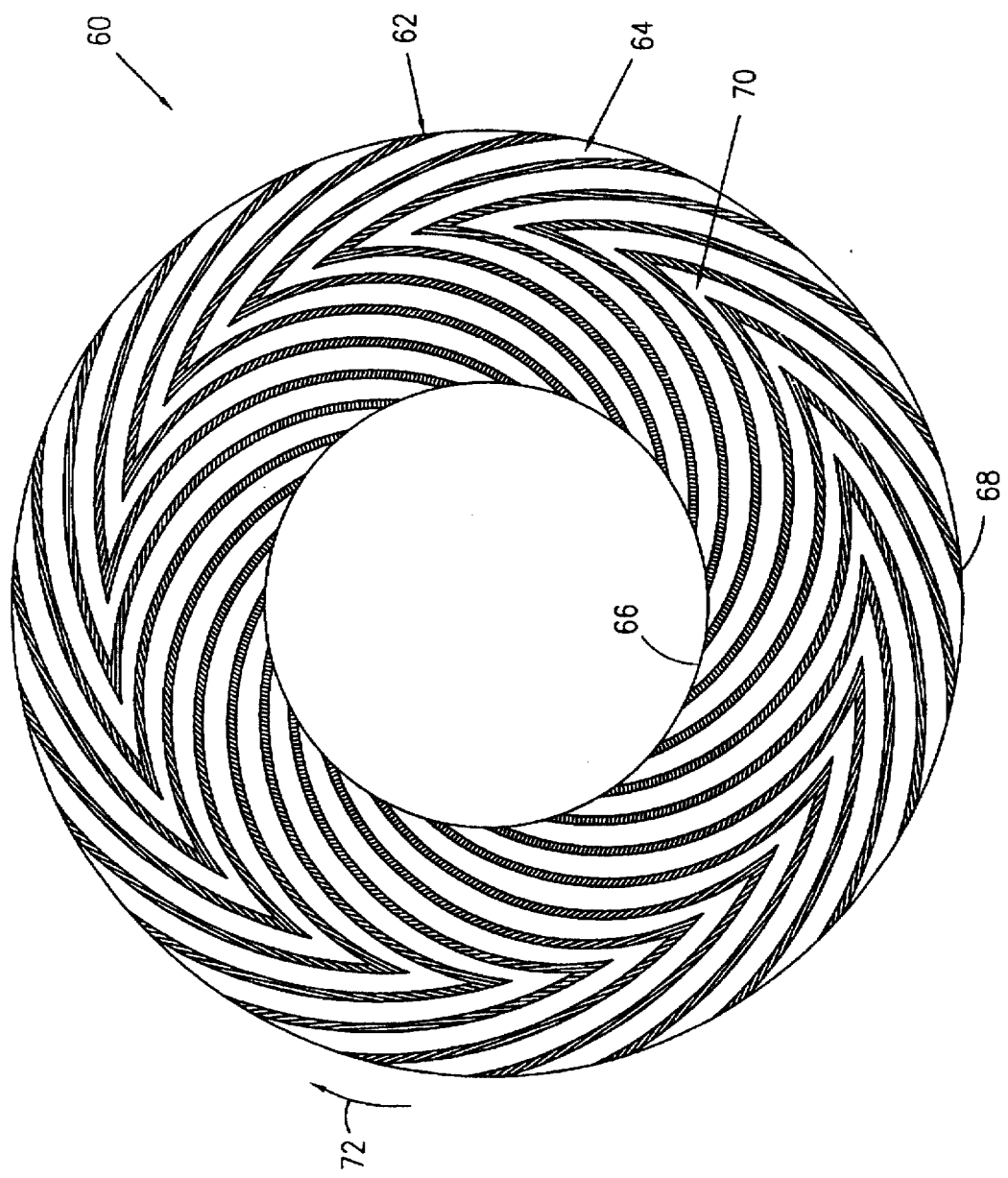
FIG. 2 is a plan view of one of the surfaces of a hydrodynamic thrust bearing.

The operation of a hydrodynamic bearing can best be understood by reference to FIG. 2, which illustrates a plan view of one of the surfaces of a hydrodynamic thrust bearing. The illustrated hydrodynamic bearing surface, generally indicated by the numeral 60, comprises a series of alternating grooves 62 and lands 64. Each groove 62 and land 64 comprises a leg which extends outward from the inner radius 66 of the hydrodynamic bearing surface 60 and a leg which extends inward from the outer radius 68 of the hydrodynamic bearing surface 60. The two legs meet in a point at an intermediate radius 70. The plurality of grooves 62 and lands 64 together form a curved herringbone pattern as illustrated in the figure.

A hydrodynamic thrust bearing is formed when the bearing surface 60 is placed adjacent to an opposed bearing surface with a film of lubricant between the two surfaces. When the bearing surface 60 is rotated in the direction 72, that is, against the herringbone pattern, the grooves 62 and lands 64 tend to draw lubricant from the inner and outer radii 66 and 68 towards the points of the herringbone pattern at 70. This creates a radial pressure distribution within the lubricant which serves to keep the bearing surfaces apart under external loading.

By varying the pattern of grooves 62 and lands 64 in a known fashion, the pressure distribution across the hydrodynamic bearing can be varied. In particular, if the pressure in the bearing lubricant is greater at the inner radius 66 than at the outer radius 68 during operation, a net flow of lubricant from the inner radius 66 to the outer radius 68 will result, and vice versa. This can be done, for example, by having the intermediate radius 70, at which the points of the herringbone pattern are located, closer to the outer radius 68. Other ways in which the pressure distribution across the hydrodynamic bearing can be varied include altering the depth or width of the grooves, the number of grooves, or the angle the grooves make with a radial axis. The significance of having a net flow of lubricant across the bearing surface is discussed below.

The grooves 62 and lands 64 may be formed in the hydrodynamic bearing surface by any number of means including, for example, electroforming or stamping.

Although the operation of a hydrodynamic bearing has been discussed with reference to a hydrodynamic thrust bearing, it will be appreciated that the above principles can be applied to a hydrodynamic journal bearing such as the hydrodynamic journal bearings 28 and 30 illustrated in FIG. 1. In particular, the pattern of the grooves and lands of the hydrodynamic journal bearings 28, 30 can be arranged to create a net flow of lubricant in a direction along the longitudinal axis of the shaft 14, i.e. towards or away from the base 12.

It will also be appreciated that a hydrodynamic bearing is not limited to the use of a herringbone pattern of grooves 62 and lands 64. For example, a spiral or sinusoidal pattern may be used as an alternative to the herringbone pattern. The herringbone pattern is however preferred for thrust bearing arrangements as it generates a pressure distribution across the bearing surface which provides improved bearing rocking stiffness. Bearing rocking stiffness is a measure of the ability of a thrust bearing to resist rotation of the bearing surfaces relative to one another about an axis transverse to the axis of rotation of the thrust bearing.

Referring again to FIG. 1, in use the hub assembly 13 (generally comprising the journal sleeve 26, counterplate 36, porous lubricant reservoirs 42 and 44 and the hub sleeve 50) is rotated relative to the base 12 by means of the electromagnetic motor comprising stator assembly 52 and magnet 54. The hub assembly is supported for smooth rotation on the shaft 14 and thrust plate 32 by the pressures generated in the lubricant at the hydrodynamic bearings 28, 30, 34 and 38.

In the illustrated embodiment of the invention, the second hydrodynamic thrust bearing 38 is configured to create a net flow of lubricant radially across its surfaces from the shaft 14 towards the first porous lubricant reservoir 42, as discussed above with reference to FIG. 2. In a similar fashion, the first hydrodynamic thrust bearing 34 is configured to create a net flow of lubricant radially across its surfaces from the first porous lubricant reservoir 42 towards the shaft 14, and the hydrodynamic journal bearing 30 is configured to create a net flow of lubricant across its surface from the thrust plate 32 towards the groove 18.

This arrangement results in the lubricant being pumped, in use, across the second hydrodynamic thrust bearing 38, past the first porous lubricant reservoir 42, across the first hydrodynamic thrust bearing 32, across the hydrodynamic journal bearing 30 to the groove 18, and back to the second hydrodynamic thrust bearing 38 via a fluid return path defined in the shaft by the passage 24 and the bore 20. A closed circulatory loop is therefore defined by the hydrodynamic bearings 38, 34 and 30, the passage 24 and the bore 20.

This circulation of the lubricant within the spindle motor assembly 10 has numerous advantages.

Firstly, the lubricant is continually mixed, and therefore no portion of the lubricant stagnates in a less active area of the bearing arrangement.

Secondly, wear particles which are created by occasional metal to metal contact of the bearing surfaces over the life of the spindle motor assembly 10 are circulated to the first porous lubricant reservoir 42 where they become trapped in the pores. The bearing surfaces are therefore continually washed clean of wear particles which are then removed from circulation by the first porous reservoir 42. This significantly increases the service life of the spindle motor assembly 10.

It should be noted that the first porous lubricant reservoir 42 is advantageously positioned adjacent to the thrust plate 32. As the wear particles are typically denser than the lubricant, centrifugal forces generated by the rotation of the hub assembly 13 cause migration of the wear particles across the surfaces of the thrust plate 32 towards the first porous reservoir 42 in which they become trapped. As the thrust plate 32 extends further from the axis of rotation of the spindle motor assembly 10 than the shaft 24, these centrifugal forces are accentuated in the region of the thrust plate 32.

This removal of wear particles is believed to have an important secondary effect. In traditional hydrodynamic bearing arrangements, it was necessary to make one bearing surface from a hard material and the other bearing surface from a ductile material, for example stainless steel and bearing bronze respectively. This was because having both bearing surfaces made of a hard material caused galling and ultimate seizing of the two bearing surfaces. It was deemed necessary to have a ductile bearing surface which yielded to the harder surface, thus preventing galling and seizing. However, the ductile surface wore more quickly than the hard surface, which in turn had an adverse effect on the service life of a hydrodynamic bearing arrangement.

With the removal of wear particles from the lubricant soon after their formation, and the clean lubricant which results from the hydrodynamic bearing of the present invention, it is possible to make both bearing surfaces materials having approximately the same hardness without the bearing arrangement galling or seizing.

The use of hard, wear resistant materials for both bearing surfaces increases hydrodynamic bearing life significantly. In the spindle motor assembly illustrated in FIG. 1, the shaft 14, journal sleeve 26, thrust plate 32 and the counterplate 36 are all made of materials having approximately the same, relatively high hardness, such as hardened 440C or 430F stainless steel.

As mentioned above, prior hydrodynamic bearing arrangements also experienced problems with leakage when filled to capacity with bearing lubricant.

The first porous lubricant reservoir 42, which is impregnated with lubricant during assembly of the spindle motor assembly 10, provides a supply of lubricant to the bearing arrangement without increasing leakage from the hydrodynamic bearing arrangement.

The hydrodynamic bearing arrangement of the present invention defines, as far as possible, small gaps which retain lubricant as a result of strong capillary forces. The additional lubricant which is stored in the first porous lubricant reservoir 42 is also retained in the pores of the reservoir 42 by capillary forces. In prior art hydrodynamic bearing arrangements, displacement of lubricant may for example be caused by air trapped in the hydrodynamic bearing arrangement. The capillary forces present in the hydrodynamic bearing arrangement of the invention resist such displacement of lubricant from the bearing arrangement, which in turn reduces overall leakage from the spindle motor assembly.

However, the size of the bearing gaps is less than the size of the pores of the lubricant reservoir 42. Therefore, if any of the hydrodynamic bearings 28, 30, 34 or 38 become starved of lubricant, the capillary forces in the bearing gaps will overcome the capillary forces in the pores of the reservoir 42, and lubricant will flow to the bearing gaps, replenishing them. Accordingly, the hydrodynamic bearings 28, 30 34 and 38 are assured of a supply of lubricant throughout the service life of the spindle motor assembly 10 without the leakage associated with previous bearing arrangements when filled to capacity with lubricant.

Leakage from the spindle motor assembly 10 is further reduced by having the hydrodynamic journal bearing 28 configured so that lubricant tends to flow towards the groove 18 in use. This is done by configuring the hydrodynamic journal bearing 28 as described above with reference to FIG. 2.

If the hydrodynamic bearing arrangement does leak lubricant, this leakage is likely to take place at the open end 56 of the hydrodynamic bearing arrangement. Lubricant which leaks from the open end 56 will migrate along the adjacent surface of journal sleeve 26 under the influence of centrifugal forces, towards the second porous lubricant reservoir 44. The second porous lubricant reservoir 44 is generally aligned with the open end 56 of the hydrodynamic bearing arrangement. As the second porous lubricant reservoir 44 is not initially impregnated with lubricant, it is able to absorb leakage of lubricant from the hydrodynamic bearing arrangement. This lubricant is then retained strongly in the pores of the reservoir 44 by capillary forces, further reducing the overall leakage of lubricant from the spindle motor assembly 10.

It will be appreciated that the invention is not limited to the embodiment of the invention described above, and many modifications are possible without departing from the spirit and the scope of the invention.

In particular, in the embodiment of a computer disc drive spindle motor assembly described above, the base 12 and the shaft 14 are held stationary relative to the remainder of the disc drive, while the journal sleeve 26 rotates relative to the remainder of the disc drive. It will be appreciated that this configuration can easily be reversed to provide a journal sleeve which is held stationary relative to the remainder of the disc drive, while a shaft rotates relative to the remainder of the disc drive.

Also, while the journal sleeve 26 is shown in FIG. 1 as being a single component, it will be appreciated that a journal sleeve could be made of multiple components which together fulfill the functions of the described journal sleeve 26.

What is claimed is:

1. A grooved hydrodynamic bearing arrangement comprising:

a journal sleeve defining a journal bore and further defining a journal thrust surface extending transversely to the journal bore;

a shaft mounted in the journal bore, the shaft having a fluid return path defined therein, the shaft and the journal bore defining together a hydrodynamic journal bearing which permits rotation of the shaft and the journal sleeve relative to one another;

a thrust plate extending transversely from the shaft and defining first and second thrust surfaces, the first thrust surface and the journal thrust surface defining together a first hydrodynamic thrust bearing;

a counterplate mounted to the journal sleeve and defining a counterplate thrust surface, the counterplate thrust surface and the second thrust surface defining together a second hydrodynamic thrust bearing; and a first porous lubricant reservoir mounted adjacent to the thrust plate; wherein the fluid return path defined in the shaft, the first and second hydrodynamic thrust bearings and the hydrodynamic journal bearing together define a closed loop through which lubricant can circulate.

2. A hydrodynamic bearing arrangement according to claim 1 wherein:

the first and second hydrodynamic thrust bearings and the hydrodynamic journal bearing each include a grooved surface, the grooved surfaces being configured to pump lubricant around the closed loop when the shaft and journal sleeve are rotated relative to one another.

3. A hydrodynamic bearing arrangement according to claim 2 wherein the first porous lubricant reservoir is made from porous polypropylene.

4. A hydrodynamic bearing arrangement according to claim 2 further comprising:

a second porous lubricant reservoir aligned with an open end of the hydrodynamic journal bearing.

5. A hydrodynamic bearing arrangement according to claim 2 further comprising an insert located in the fluid return path.

6. A hydrodynamic bearing arrangement according to claim 5 wherein the insert comprises a length of nylon line.

7. A hydrodynamic bearing arrangement according to claim 2 wherein the thrust plate and the counterplate are both made of materials having approximately equal hardnesses.

8. A hydrodynamic bearing arrangement according to claim 2 wherein the journal thrust surface and the shaft are both made of materials having approximately equal hardnesses.

9. A hydrodynamic bearing arrangement according to claim 2 wherein the thrust plate, the counterplate, the journal sleeve and the shaft are all made of materials having approximately equal hardnesses.

10. A hydrodynamic bearing arrangement according to claim 9 wherein the thrust plate, the counterplate, the journal sleeve and the shaft are all made of stainless steel.

11. A hydrodynamic bearing arrangement according to claim 2 wherein the first porous lubricant reservoir has a pore size of between 0.07 mm and 0.10 mm.

12. A hydrodynamic bearing arrangement according to claim 11 wherein there is a clearance between the thrust plate and the first porous lubricant reservoir which is greater than the pore size.

13. A hydrodynamic bearing arrangement according to claim 11 wherein the size of each of the bearing gaps at the first and second hydrodynamic thrust bearings is between 0.005 mm and 0.020 mm.

14. A hydrodynamic bearing arrangement according to claim 13 wherein the size of each of the bearing gap at the hydrodynamic journal bearing is between 0.003 mm and 0.006 mm.

* * * * *